United States Patent [19]

Hilliard, Jr. et al.

[11] Patent Number: 5,377,723

[45] Date of Patent: Jan. 3, 1995

[54] METHOD AND APPARATUS FOR VENTING A STORAGE VESSEL

[75] Inventors: Henry T. Hilliard, Jr., 3822 Piping Rock, Houston, Tex. 77027; Jerry B. Roach, Houston; Gary N. Lawrence, Friendswood, both of Tex.

[73] Assignee: Henry T. Hilliard, Jr., Houston, Tex.

[21] Appl. No.: 117,397

[22] Filed: Sep. 3, 1993

[51] Int. Cl.$^6$ ............................................. F17C 5/00
[52] U.S. Cl. .................................... 141/4; 141/9; 141/70; 141/63; 141/83; 141/100; 141/197
[58] Field of Search ................... 141/1, 4, 8, 9, 70, 141/11, 44, 45, 51-53, 63, 65, 67, 59, 83, 94, 100, 82, 192, 197; 62/50.2-50.4

[56] References Cited

U.S. PATENT DOCUMENTS

| 249,918 | 11/1881 | Forster . | |
| 290,558 | 12/1883 | Finn | 220/745 |
| 291,085 | 1/1884 | Reinecke | 220/745 |
| 1,269,639 | 6/1918 | Parr . | |
| 1,918,100 | 7/1933 | Harnsberger . | |
| 2,682,752 | 7/1954 | Branson . | |
| 3,012,591 | 12/1961 | McCormack et al. | 141/4 |
| 3,123,249 | 3/1964 | Gorand et al. . | |
| 3,556,174 | 1/1971 | Gibble et al. | 141/69 |
| 3,763,901 | 10/1973 | Viland | 141/52 X |
| 3,783,911 | 1/1974 | Husa et al. | 141/11 |
| 3,817,687 | 6/1974 | Cavallero et al. | 431/202 |
| 3,914,095 | 10/1975 | Straitz, III | 141/52 X |
| 3,914,115 | 10/1975 | Parker, Sr. | 55/32 |
| 3,918,932 | 11/1975 | Lee et al. | 55/62 |
| 3,926,230 | 12/1975 | Stary et al. | 141/45 |
| 3,972,201 | 8/1976 | Datis | 62/54 |
| 4,134,271 | 1/1979 | Datis | 62/54 |
| 4,162,694 | 7/1979 | Caldwell | 141/1 |
| 4,187,689 | 2/1980 | Selcukoglu et al. | 62/54 |
| 4,344,467 | 8/1982 | Lahde | 141/197 X |
| 4,469,143 | 9/1984 | Vazin | 141/1 |
| 4,604,115 | 8/1986 | Bonneton et al. | 62/50.2 X |
| 4,765,143 | 8/1988 | Crawford et al. | 60/671 |
| 4,981,153 | 1/1991 | Perkins | 137/1 |
| 5,017,240 | 5/1991 | Brown | 134/22.1 |
| 5,172,738 | 12/1992 | Komukai et al. | 141/83 |
| 5,186,219 | 2/1993 | Gold et al. | 141/51 |

FOREIGN PATENT DOCUMENTS 8196396 11/1983 Japan ........................ 141/9

Primary Examiner—J. Casimer Jacyna
Attorney, Agent, or Firm—Winstead Sechrest & Minick

[57] ABSTRACT

A method and apparatus for venting volatile organic compound vapors from a liquid storage vessel which includes the steps of introducing a purge medium to a liquid storage vessel containing volatile organic compound vapors and establishing an uniform and continuous stratified interface between the purge medium and the volatile organic compound vapors. The introduction of the purge medium is continued causing the continuous stratified interface to move within the vessel purging the undiluted volatile organic compound vapors from the vessel and into a vapor recovery line which delivers the volatile organic compound vapors to a vapor handling device. Preferably, the purge medium comprises carbon dioxide or nitrogen.

8 Claims, 4 Drawing Sheets

METHOD AND APPARATUS FOR VENTING A STORAGE VESSEL

BACKGROUND OF THE INVENTION

1. Field of the Invention

The present invention relates to a method and apparatus for venting residual vapors from a liquid storage vessel. More particularly, the present invention relates to a method and apparatus for venting residual vapors from a liquid storage vessel by introducing a gas to the storage vessel after removal of all liquids to provide a motive force to vent the vapors.

2. Description of the Prior Art

Volatile liquids, such as benzene, petroleum and the like, are often stored in tanks at bulk terminals, refineries and end-user facilities, and transported in tanks aboard barges or ships, tank trucks and rail cars. All such containers shall be referred to herein as liquid storage vessels. While resident in these liquid storage vessels, volatilization of the liquid occurs leaving residual vapors which must be removed before workmen can be permitted to enter the vessel and before the vessel can be filled with a different liquid.

Currently, such residual vapors are purged by flooding liquid storage vessels with a sufficient volume of water or air to entrain the vapors and carry them out of the vessel. The resulting mixture of diluted vapors, in many cases, are simply emitted to the atmosphere and surrounding water supply where they pollute the environment. Emissions handled in this manner lead to severe environmental hazards. For example, the inhalation of benzene vapors may cause depression of bone marrow activity, convulsions and paralysis. In addition, hydrocarbons are a major contributor to the formation of smog which has been proven to increase respiratory disorders among the population.

In addition to these environmental problems, water flushing facilities must overcome many economic hurdles. Adequate water for such facilities may be expensive due to limited water resources or to restrictions concerning the reuse or recycling of the water. If the water must be reused or recycled, it must be treated to remove contaminants that might pollute the environment or contaminate the next vessel to be flushed.

The environmental problems associated with air flushing could be eliminated by sending the mixture of vented air and vapors to a combustion device where the harmful vapors would be destroyed rather than emitted to the atmosphere. Unfortunately, as much as three times the liquid storage vessel volume of air must be cycled through the vessel to ensure that all of the residual vapors are purged from the vessel. Clearly, such a solution is impractical because of the large amount of air which would have to be heated in a combustion device before the volatiles they carry would be destroyed. The size of the collection piping and combustion equipment associated with such a process, in addition to the amount of fuel required to combust the vapors, similarly would be quite large, thereby prohibitively increasing the cost of such a process.

There have been several patents in the prior art which attempted to address the problem of removing vapors from storage tanks and collecting the gases which are forced out of the storage tank to reuse such gases for combustion.

U.S. Pat. No. 291,085 shows apparatus for removing flammable gases from oil tanks which includes devices for causing an induced current of air to pass into a storage tank above the surface of the fluid (such as fuel oil) and at the same time conduct displaced gases to a point where they may be used as fuel or discharged with safety into the atmosphere. The patent which issued in 1884 teaches the use of air as a medium for forcing gaseous vapors from a storage tank.

It has been learned over the past hundred years that air is an unsafe medium for use in cleansing storage tanks and also can result in corrosion of the tank. The device shown by the patent is relatively simple and primitive and does not include the safety features or efficient means for recapture of vapors for other use as is claimed by the present invention.

U.S. Pat. No. 1,918,100 shows a gas-gathering system which is basically a closed system in which vapors which collect in a storage tank are pumped into a secondary vapor storage tank partially filled with water and from the vapor storage tank are recaptured through a compression and condensing process to provide dry gas for other uses such as combustion. The patent states as its primary objective the provision of a method and apparatus for maintaining a hydrocarbon gas at all times within the storage tanks above the liquid levels thereof with the specific end in view of preventing air or oxygen from entering the tanks and mixing with the gases contained therein.

It should be noted at this point that this patent specifically teaches away from the method and apparatus of the 291,085 patent in that 291,085 teaches the use of air as a medium for moving vapors out of a storage tank, and 1,918,100 specifically provides a method to prevent air or oxygen from entering the tank and mixing with the gases.

Although the 1,918,100 patent is a more modern gas collection system apparatus and method, it does not show nor suggest the present invention which includes control of the flow of a purge medium to provide a laminar flow to create a continuous stratified interface between the volatile vapors and the purge medium. Nor does 1,918,100 teach or suggest any mechanism for detection of completion of the purging operation nor mixing with a high BTU material for later combustion. Nor does either prior art patent introduce gas at the bottom of the tank as is shown and claimed with respect to one embodiment of the present invention.

SUMMARY OF THE INVENTION

The method and apparatus for venting a liquid storage vessel of the present invention overcome the above-noted disadvantages and drawbacks which are characteristic of the prior art.

The present invention is directed to a method which comprises the steps of introducing a purge medium to a liquid storage vessel containing volatile organic compound vapors and establishing a uniform and continuous stratified interface between the purge medium and the volatile organic compound vapors. The introduction of the purge medium is continued causing the continuous stratified interface to move within the vessel purging the undiluted volatile organic compound vapors from the vessel.

In a preferred embodiment, a purge medium, preferably carbon dioxide, is introduced to the bottom of a liquid storage vessel containing relatively light volatile organic compound vapors establishing a uniform and continuous stratified interface between the purge medium and the volatile organic compound vapors. The introduction of the purge medium is continued causing the continuous stratified interface to rise within the vessel purging the undiluted volatile organic compound vapors from the top of the vessel.

In an alternate preferred embodiment, a purge medium, preferably nitrogen, is introduced to the top of a liquid storage vessel containing relatively heavy volatile organic compound vapors establishing a uniform and continuous stratified interface between the purge medium and the volatile organic compound vapors. The introduction of the purge medium is continued causing the continuous stratified interface to descend within the vessel purging the undiluted volatile organic compound vapors from the bottom of the vessel.

In a preferred embodiment, the undiluted volatile organic compound vapors are purged into a vapor recovery line which delivers the volatile organic compound vapors to a vapor handling device.

The present invention also is directed to apparatus for performing the above-described methods.

BRIEF DESCRIPTION OF THE DRAWINGS

Numerous objects, features and advantages of the present invention will be readily apparent to those of ordinary skill in the art upon a reading of the following disclosure when taken in conjunction with the accompanying drawings, in which.

DETAILED DESCRIPTION OF THE PREFERRED EMBODIMENTS

Figure 1:
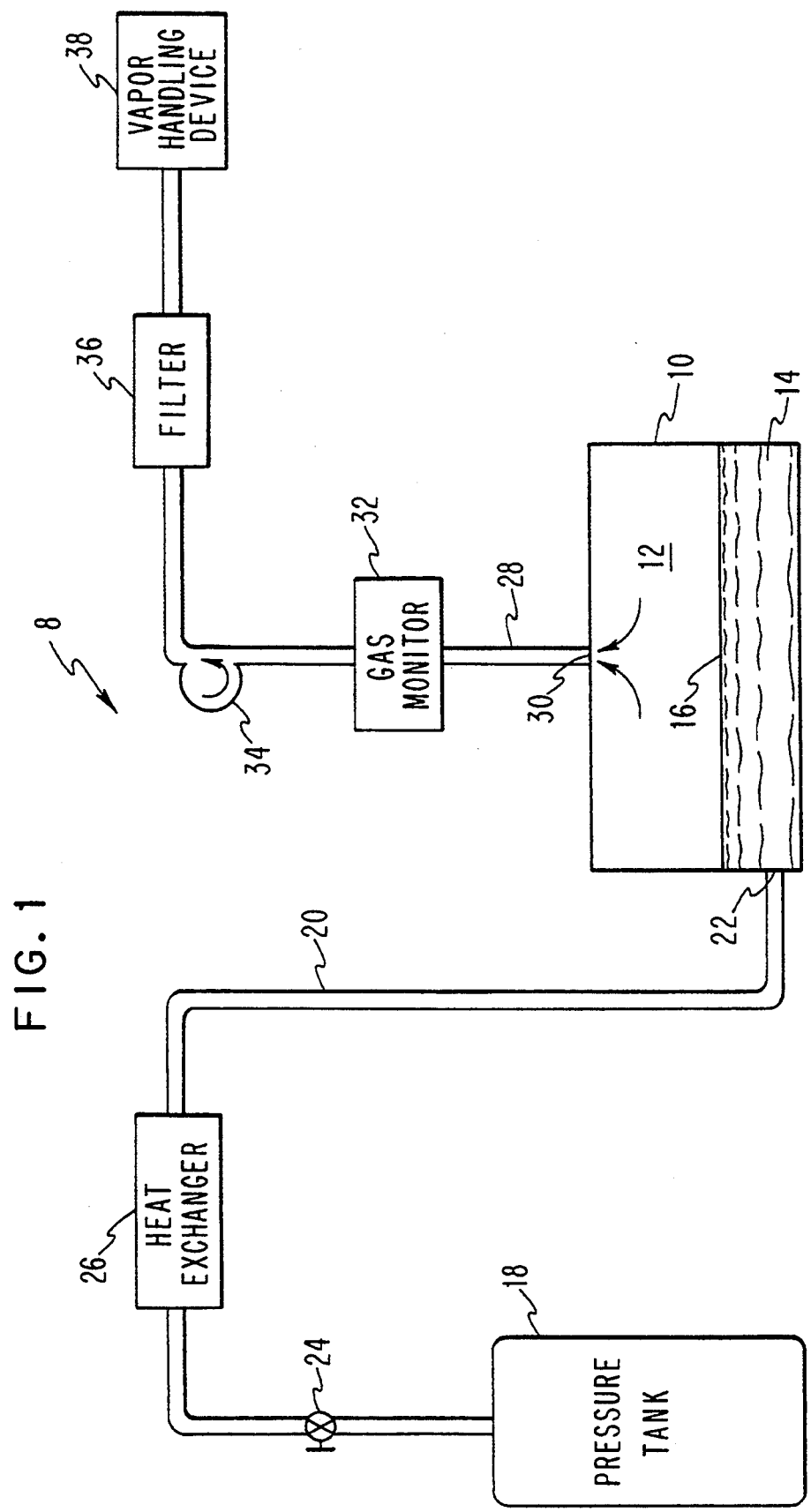
FIG. 1 shows a schematic view of apparatus for performing the storage tank venting method of the present invention.

Referring now to the drawings, and particularly to FIG. 1, a schematic representation of a preferred embodiment of a liquid storage vessel venting apparatus arranged to perform the method of the present invention is generally shown at 8. A liquid storage vessel 10 of typical construction has apertures for receiving and dispensing various fluids, including volatile organic compounds such as benzene and petroleum products which generate vapors 12.

According to this embodiment, a gas 14 is introduced at or near the bottom of the vessel 10 to provide a motive force to purge the vapors 12 from the vessel 10. The gas 14 preferably is heavier than and inert with respect to the vapors 12, and is introduced to the vessel 10 in a laminar, or near laminar, flow with little or no turbulence. As the gas 14 enters the vessel 10, an uniform stratification develops with the vapors 12 forming a layer above a layer formed by the gas 14. In this manner, mixing of the gas 14 with the vapors 12 is avoided and the vapors 12 remain undiluted. As shown in FIG. 1, an uniform interface 16 develops between the gas 14 and the vapors 12. As more gas 14 is introduced to the vessel 10, the interface 16 approaches the top of the vessel 10 driving the undiluted vapors 12 from the vessel 10. Preferably, the gas 14 is such that it may be dispersed into the environment without contaminating the surrounding area. Preferably, the gas 14 comprises carbon dioxide. Those of ordinary skill in the art will recognize that other gases that are heavier than the vapors 12 may also be utilized as the gas 14.

A supply of gas 14 is provided in an insulated tank 18. Preferably, the gas 14 is stored in the tank 18 in a chilled liquid state. The gas 14 is delivered to the vessel 10 through a fill line 20. The fill line 20, preferably, introduces the gas 14 to the vessel 10 via an opening 22 disposed near the bottom of the vessel 10. A valve 24 is provided in the fill line 20 to control the flow of the gas 14 from the tank 18.

Preferably, the gas 14 is stored as a liquid under high pressure. The gas 14 undergoes a pressure reduction as it leaves the tank 18 causing the gas to auto-refrigerate in the fill line 20. A heat exchanger 26 is provided to interact thermally with the gas 14 as it passes through the fill line 20 to raise the temperature of the gas 14 to a desired point, preferably to about 0° F.

Figure 2:
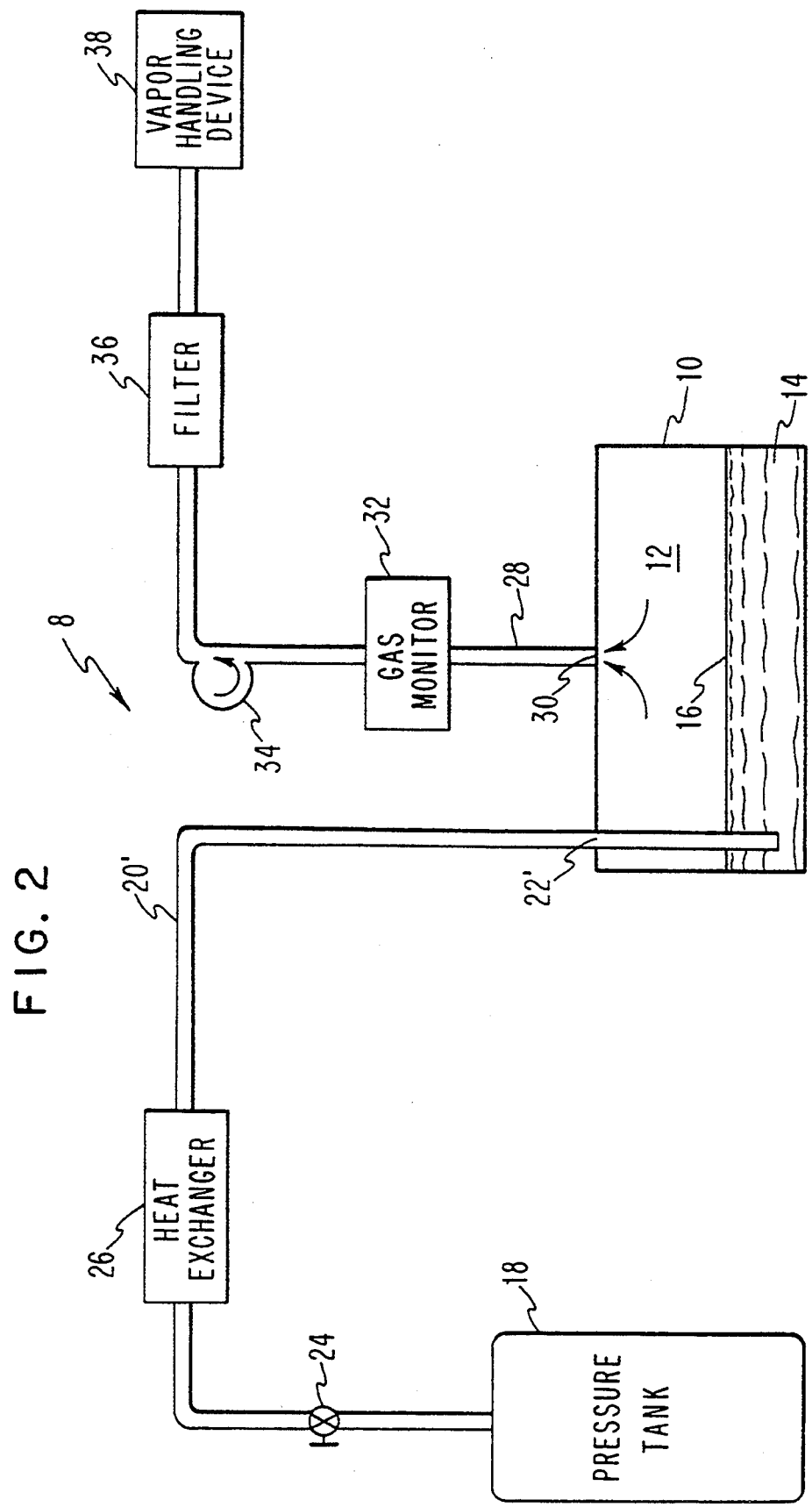
FIG. 2 shows a schematic view of a modified version of the apparatus depicted in FIG. 1.

As shown in FIG. 2, the gas 14 may alternately be delivered to the vessel 10 through a fill line 20, which extends through an opening 22, disposed on the top of the vessel 10. The distal end of the fill line 20, is disposed near the bottom of the vessel 10 to introduce the gas 14 beneath the vapors 12.

Referring to both FIGS. 1 and 2, a vapor recovery line 28 extends from an opening 30 disposed in the roof of the vessel 10 to receive the vapors 12 that are purged from the vessel 10 as it is filled with the gas 14. A gas detector 32 may be provided in the recovery line 28 to monitor the gas purged from the vessel 10 to check for the presence of the gas 14. When the gas 14 is detected by the gas detector 32, the venting process has been completed.

A low pressure blower 34 may be provided to receive the vapors 12 exiting detector 32 and to direct the vapors 12 to a vapor handling device described below. To prevent the vessel 10 from collapsing, care must be taken to prevent the blower 34 from creating an excessive vacuum within the vessel 10.

The vapors 12 may be directed by the blower 34 through a filter 36 for extracting condensed liquids from the vapors 12 flowing through the recovery line 28. After passing through the filter 36, the vapors 12 may be passed to a vapor handling device 38 where the vapors 12 are processed for further handling. Preferably, the vapors are combusted and destroyed prior to their emission to the atmosphere. If the combustibility of the vapors 12 is insufficient for adequate burning, a supply of natural gas, propane, butane or other high BTU source material may be provided under the control of a valve to increase the BTU level of the vapors 12. Alternatively, the vapors 12 can be condensed or cooled to a liquid form by a refrigeration system. The recovered liquids can be deposited in a storage tank for further handling. The vapors 12 can also be sent to a system in which the vapors 12 are compressed and refrigerated for further handling. Another possibility is that the vapors 12 can be passed through a molecular sieve material that absorbs hydrocarbons. Those of ordinary skill in the art will recognize that other vapor handling devices may be utilized as the circumstances may dictate.

The gas 14 which now fills the vessel 10 may be dispersed from the vessel 10 directly to the atmosphere Either immediately, or upon the refilling of the vessel 10.

Figure 3:
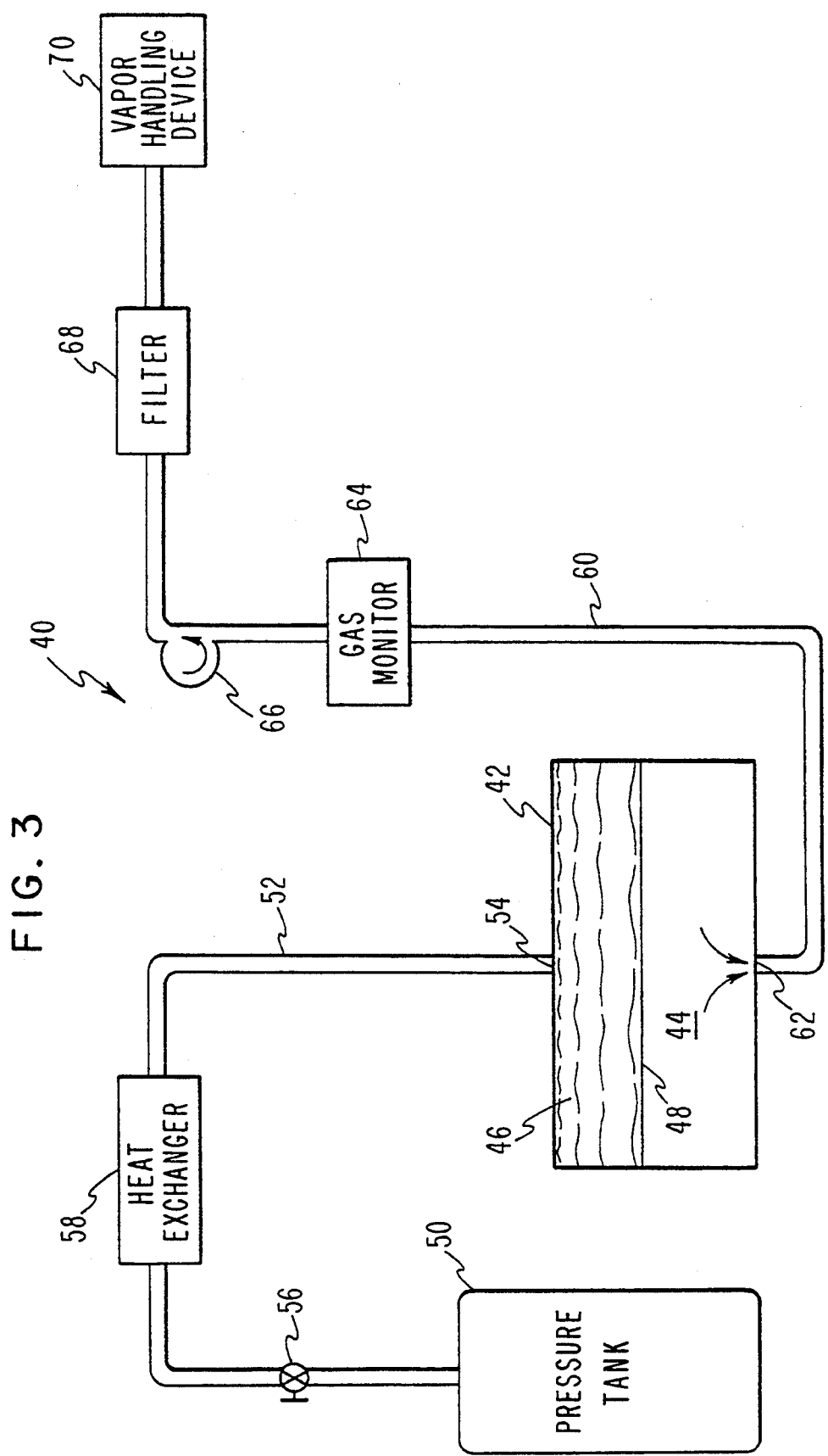
FIG. 3 shows a schematic view of apparatus for performing the storage tank venting method of the present invention.

Referring now to FIG. 3, a schematic of another preferred embodiment of the present invention is shown and referred to in general by the reference numeral 40. A liquid storage vessel 42 of typical construction has apertures for receiving and dispensing various fluids, including volatile organic compounds such as benzene and petroleum products which generate vapors 44.

According to this embodiment, a gas 46 is introduced at or near the top of the vessel 42 to provide a motive force to purge the vapors 44 from the vessel 42. The gas 46 preferably is lighter than and inert with respect to the vapors 44, and introduced to the vessel 42 in a laminar, or near laminar, flow with little or no turbulence. As the gas 46 enters the vessel 42, an uniform stratification develops with the gas 46 forming a layer above a layer comprised of the vapors 44. In this manner, mixing of the gas 46 with the vapors 44 is avoided and the vapors 44 remain undiluted. As shown in FIG. 3, an uniform interface 48 develops between the gas 46 and the vapors 44. As more gas 46 is introduced to the vessel 42, the interface 48 approaches the bottom of the vessel 42 driving the undiluted vapors 44 from the vessel 42. Preferably, the gas 46 is such that it may be dispersed into the environment without contaminating the surrounding area. Preferably, the gas 46 comprises nitrogen, but those of ordinary skill in the art will recognize that other gases that are lighter than the vapors 44 may also be utilized as the gas 46.

A supply of gas 46 is provided in an insulated tank 50. Preferably, the gas 46 is stored in the tank 50 in a chilled liquid state. The gas 46 is delivered to the vessel 42 through a fill line 52. The fill line 52, preferably, introduces the gas 46 to the vessel 42 via an opening 54 disposed near the top of the vessel 42. A valve 56 is provided in the fill line 52 to control the flow of the gas 46 from the tank 50.

Preferably, the gas 46 is stored as a liquid under high pressure. The gas 46 undergoes a pressure reduction as it leaves the tank 50 causing the gas to auto-refrigerate in the fill line 52. A heat exchanger 58 is provided to interact thermally with the gas 46 as it passes through the fill line 52 to raise the temperature of the gas 46 to a desired point, preferably to about 0° F.

Figure 4:
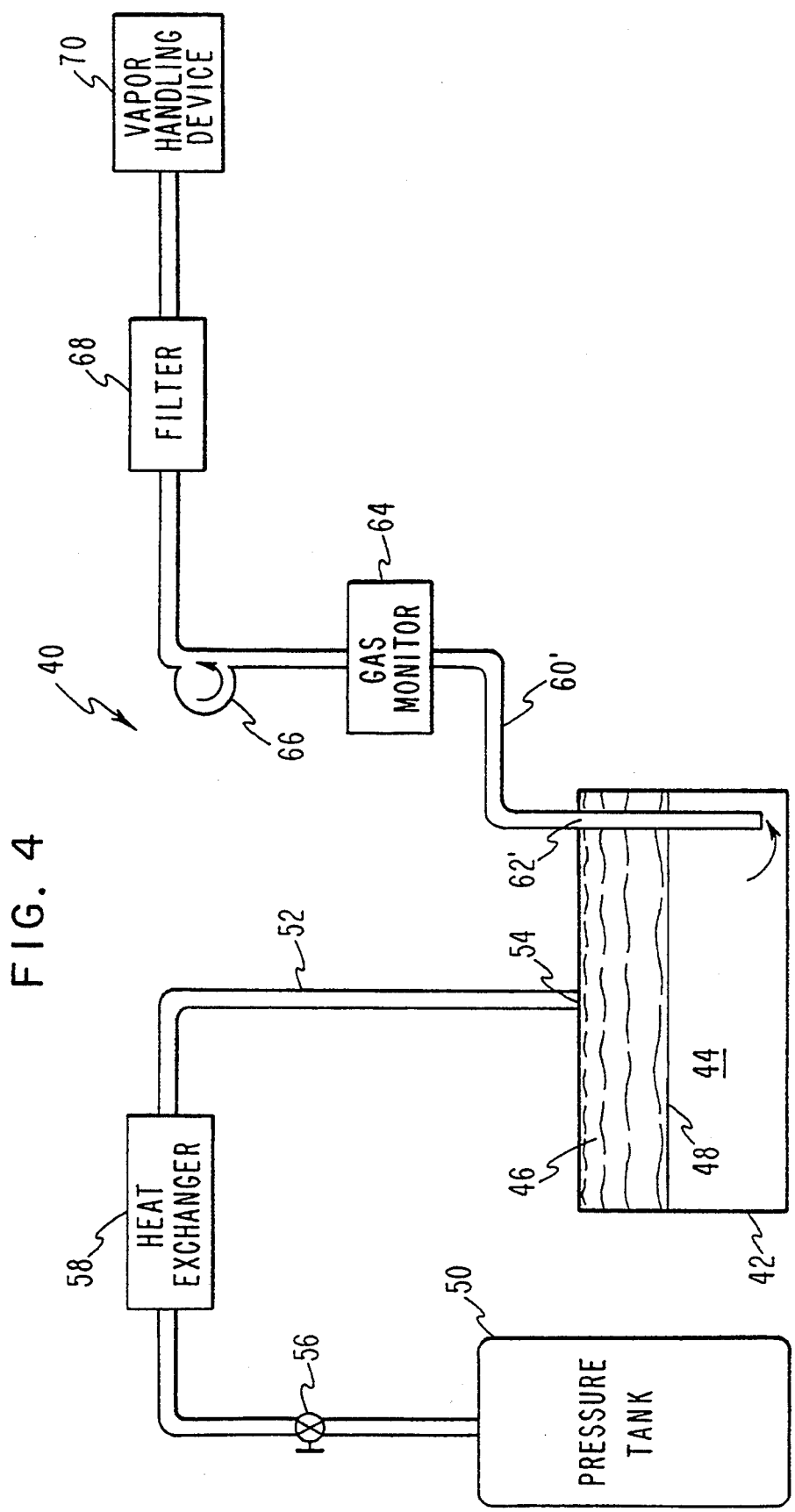
FIG. 4 shows a schematic view of a modified version of the apparatus depicted in FIG. 3.

A vapor recovery line 60 extends from an opening 62 disposed near the bottom of the vessel 42 to receive the vapors 44 that are purged from the vessel 42 as it is filled with the gas 46. Alternatively, and as shown in FIG. 4, a vapor recovery line 60, extends into the vessel 42 through an opening 62, disposed on the top of the vessel 42. The proximal end of the recovery line 60, is disposed near the bottom of the vessel 42 to receive the vapors 44 as the vessel 42 fills with the gas 46.

Referring to both FIGS. 3 and 4, a gas detector 64 may be provided in the recovery line 60 or 60, to monitor the gas purged from the vessel 42 to check for the presence of the gas 46. When the gas 46 is detected by the gas detector 64, the venting process has been completed.

A low pressure blower 66, a filter 68, and a vapor handling device 70 may be provided to receive the vapors 44 exiting the detector 64 to process them for further handling. Since these devices are the same as the corresponding devices described in connection with the previous embodiment, they will not be described here in detail.

The present invention will be further illustrated by the following specific examples, it being understood that while these examples may describe in detail some of the preferred features of the invention, they are merely provided for the purpose of illustration and are not intended to limit the broader aspects of the present invention.

EXAMPLE 1

A test of the present invention was conducted to vent the gaseous contents of a liquid storage vessel carried aboard a barge. For the purpose of this test, volatile organic compound vapors were removed from the tank so that it contained only air.

Liquid carbon dioxide stored in a refrigerated tank truck at about about 0° F. and about 300 psia was released into a fill line, which reduced the pressure of the gas from 300 psia to about 100 psia causing the carbon dioxide gas to auto-refrigerate to about −35° F. The temperature of the carbon dioxide gas was raised to about 30° F. by passing the gas through a steam heat exchanger. From this point the pressure of the carbon dioxide within the fill line was dropped to atmospheric pressure without forming solids. This pressure reduction, however, again caused the carbon dioxide gas to auto-refrigerate to about 0° F.

The carbon dioxide gas was then introduced to the bottom of the vessel through an 8 inch line at a flow rate of approximately 7,000 cfh. It was admitted in a nonturbulent, metered flow to create an even and uniform stratification between the air present in the vessel and the incoming carbon dioxide gas. An air-carbon dioxide gas interface formed in the vessel and continually rose toward the roof of the vessel as more carbon dioxide gas was admitted. As the interface rose, the air in the vessel was forced toward and through an opening in the roof of the vessel without experiencing any significant mixing of the air and carbon dioxide gas, leaving the vessel completely void of air and full of carbon dioxide gas.

EXAMPLE 2

All liquids are removed from a liquid storage vessel carried aboard a barge. The liquid storage vessel contains volatile organic compound vapors.

Liquid carbon dioxide stored in a refrigerated tank truck at and about 0° F. and about 300 psia is released into a fill line, which reduces the pressure of the gas from 300 psia to about 100 psia causing the carbon dioxide gas to auto-refrigerate to about −35° F. The temperature of the carbon dioxide gas is raised to about 30° F. by passing the gas though a steam heat exchanger. From this point the pressure of the carbon dioxide within the fill line is dropped to atmospheric pressure without forming solids. This pressure reduction, however, again causes the carbon dioxide gas to auto-refrigerate to about 0° F.

The carbon dioxide gas is then introduced to the bottom of the vessel through an 8 inch line at a flow rate of approximately 7,000 cfh. It is admitted in a nonturbulent, metered flow to create an even and uniform stratification between the volatile organic compound vapors present in the vessel and the incoming carbon dioxide gas. A volatile organic compound vapor-carbon dioxide gas interface forms in the vessel and continually rises toward the roof of the vessel as more carbon dioxide gas is admitted. As the interface rises, the air in the vessel is forced toward and through an opening in the roof of the vessel without experiencing any significant mixing of the volatile organic compound vapors and carbon dioxide gas, leaving the vessel completely void of volatile organic compound vapors and full of carbon dioxide gas.

The purged volatile organic compound vapors, undiluted by employing the present invention, are forced into a recovery line connected to the vessel. The carbon dioxide gas is introduced into the vessel until a detector in the recovery line detects the presence of the carbon dioxide gas. At this point, due to the uniform stratification maintained within the vessel, all of the residual vapors originally in the vessel are purged from the vessel, and the vessel is filled solely with carbon dioxide gas. A blower attached to the recovery line directs the vapors through a filter to remove any condensed liquids within the vapor stream. The blower also directs the vapors to a combustion device where, if needed, the vapors are mixed with natural gas or other high BTU source and combusted prior to their emission to the atmosphere.

It is thus seen that the method and apparatus of the present invention provides several advantages. In general, the present invention reduces the amount of purge medium necessary to vent residual vapors from all types of liquid storage vessels to nearly a single vessel volume. In addition, since the present invention eliminates the need for flushing water or air, it is an environmentally safe and efficient way to vent residual vapors. Further, since the vapors are not diluted, the combustibility of the vapors might be sufficiently high for burning, or at the very least they can be combusted with a minimal addition of fuel. The present invention can also be used to purge residual vapors that are either heavier or lighter than the purge medium.

It is understood that variations of the foregoing can be made within the scope of the present invention. For example, numerous purging mediums can be used to provide the motive force to vent the vessel 10 or 42. Further, the present invention can be used to vent more than just volatile organic compound vapors from liquid storage vessels. It is applicable for venting any type of gaseous fluid from any type of enclosure.

Further, the gas detector can be replaced by a flow meter which measures the amount of purging medium introduced into the vessel. A single turnover of the vessel volume plus 10% extra gas will sufficiently vent the vapors from the vessel. Since the volume flow rate of the gas and the volume of the vessel are known, the flow meter can also be eliminated, by calculating and using the time needed to introduce enough gas to equal 1.1 times the volume of the vessel. In addition, the blower can be eliminated if the structural design of the vessel is sufficiently high to allow for pushing the vented vapors through the collection piping.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for venting vapors from a storage vessel, comprising the steps of:
   (i) connecting a fill line to a storage vessel containing vapors;
   (ii) connecting a vapor recovery line to said vessel;
   (iii) releasing a gas into said fill line;
   (iv) reducing the pressure on said gas to auto-refrigerate said gas;
   (v) introducing said gas in said vessel to establish a uniform interface between said gas and said vapors in said vessel;
   (vi) forcing said vapors into said vapor recovery line until said gas is detected in said vapor recovery line;
   (vii) removing condensed liquids from said vapors in said vapor recovery line;
   (viii) increasing the combustibility of said vapors in said vapor recovery line by combining said vapors with a high BTU source material in said vapor recovery line; and
   (ix) burning said vapors.

2. The method of claim 1 wherein said gas is selected from the group consisting of carbon dioxide and nitrogen.

3. The method of claim 1 wherein said gas is introduced at the top of said vessel.

4. The method of claim 1 wherein said gas is introduced at the bottom of said vessel.

5. Apparatus for venting vapors from a storage vessel, comprising:
   (i) a storage vessel containing vapors;
   (ii) a fill line connected to said vessel;
   (iii) a vapor recovery line connected to said vessel;
   (iv) means for releasing a purge medium into said fill line;
   (v) means for dropping the pressure of said purge medium causing said purge medium to auto-refrigerate;
   (vi) means for heating said purge medium in said fill line to a desired temperature;
   (vii) means for introducing said purge medium into said vessel to establish a uniform interface between said purge medium and said vapors;
   (viii) means for detecting said purge medium in said vapor recovery line;
   (ix) means for removing condensed liquids from said vapors in said vapor recovery line;
   (x) means for increasing the combustibility of said vapors in said vapor recovery line by combining said vapors with a high BTU material in said vapor recovery line; and
   (xi) means for burning said vapors.

6. The apparatus of claim 5 wherein said purge medium is selected from the group consisting of carbon dioxide and nitrogen.

7. The apparatus of claim 5 wherein said introducing means is connected to the top of said vessel.

8. The apparatus of claim 5 further comprising means for passing said purge medium into the lower portion of said vessel.

* * * * *